(12) United States Patent
Luo et al.

(10) Patent No.: US 12,536,779 B2
(45) Date of Patent: Jan. 27, 2026

(54) FACILITATING IDENTIFICATION OF ERROR IMAGE LABEL

(71) Applicant: International Business Machines Corporation, Armonk, NY (US)

(72) Inventors: Deng Xin Luo, Xi'an (CN); Xiang Yu Yang, Xi'an (CN); Yong Wang, Xi'an (CN); Ye Wang, Xi'an (CN); Zhong Fang Yuan, Xi'an (CN); Wen Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 18/358,274

(22) Filed: Jul. 25, 2023

(65) Prior Publication Data

US 2025/0037432 A1      Jan. 30, 2025

(51) Int. Cl.
*G06V 10/774* (2022.01)
*G06V 10/98* (2022.01)

(52) U.S. Cl.
CPC ............ *G06V 10/774* (2022.01); *G06V 10/98* (2022.01)

(58) Field of Classification Search
None
See application file for complete search history.

(56) References Cited

U.S. PATENT DOCUMENTS 9,031,331 B2   5/2015   Mensink
10,496,369 B2  12/2019  Guttmann
2021/0312227 A1* 10/2021 Moradiannejad ..... G06F 18/214
2021/0374543 A1* 12/2021 Matsumoto ......... G06F 18/2148
2022/0366254 A1* 11/2022 Zou ........................ G06V 10/98

FOREIGN PATENT DOCUMENTS

| CN | 111506776 A | 3/2021 |
| CN | 113962999 A | 1/2022 |
| CN | 114881125 A | 8/2022 |
| CN | 115146622 A | 10/2022 |
| CN | 115641480 A | 1/2023 |

(Continued)

OTHER PUBLICATIONS

Abid et al., "Improving Training on Noisy Structured Labels", arXiv:2003.03862v1 [cs.LG] Mar. 8, 2020, 13 pages.

(Continued)

*Primary Examiner* — Leon Flores
(74) *Attorney, Agent, or Firm* — Scott Dobson

(57) ABSTRACT

A method, computer system, and program product facilitate identification of error image labels in training data. The method comprises: evenly dividing a training dataset into N subsets, where the training dataset includes M data items each comprising a pair of image and its original image label; training a prediction model to label images by respectively using each of the N subsets as training data to generate N respective trained prediction models; respectively using each of the N trained prediction models trained by using one of the N subsets as training data to label the images in other N-1 subsets of the N subsets to generate N-1 prediction labels for each of the M images in the training dataset. For each image in the M data items, whether the original image label of the image is a potential error image label is based on the N-1 prediction labels of the image.

20 Claims, 7 Drawing Sheets

(56) References Cited

FOREIGN PATENT DOCUMENTS

JP         2020518915 A    6/2020
KR        102245896 B1    4/2021

OTHER PUBLICATIONS

Anonymous, "Robust Learning with Decoupled Meta Label Purifier", Under review as a conference paper at ICLR 2023, 18 pages.

Cui et al., "Label Error Correction and Generation through Label Relationships", The Thirty-Fourth AAAI Conference on Artificial Intelligence (AAAI-20), pp. 3693-3700.

Mallem et al., "Efficient Meta label correction based on Meta Learning and bi-level optimization", Abstract Only, Engineering Applications of Artificial Intelligence, vol. 117, Part A, Jan. 2023, https://doi.org/10.1016/j.engappai.2022.105517, 6 pages.

Wu et al., "Learning to Purify Noisy Labels Via Meta Soft Label Corrector", arXiv:2008.00627v1 [cs.CV] Aug. 3, 2020, 12 pages.

\* cited by examiner

201

```
┌─────────────────────────────────────────────────────┐
│ EVENLY DIVIDE A TRAINING DATASET INTO N             │
│ SUBSETS, WHEREIN THE TRAINING DATASET               │
│ INCLUDES M DATA ITEMS EACH COMPRISING A             │
│ PAIR OF IMAGE AND ITS ORIGINAL IMAGE LABEL          │
│                      210                            │
└─────────────────────────────────────────────────────┘
                          │
┌─────────────────────────────────────────────────────┐
│ TRAIN A PREDICTION MODEL TO LABEL IMAGES            │
│ BY RESPECTIVELY USING EACH OF THE N                 │
│ SUBSETS AS TRAINING DATA, THEREBY                   │
│ GENERATING N RESPECTIVE TRAINED                     │
│ PREDICTION MODELS                                   │
│                      220                            │
└─────────────────────────────────────────────────────┘
                          │
┌─────────────────────────────────────────────────────┐
│ RESPECTIVELY USE EACH OF THE N TRAINED              │
│ PREDICTION MODELS TRAINED BY USING ONE OF THE N     │
│ SUBSETS AS TRAINING DATA TO LABEL THE IMAGES IN     │
│ OTHER N-1 SUBSETS OF THE N SUBSETS, THEREBY         │
│ GENERATING N-1 PREDICTION LABELS FOR EACH OF THE    │
│ M IMAGES IN THE TRAINING DATASET                    │
│                      230                            │
└─────────────────────────────────────────────────────┘
                          │
┌─────────────────────────────────────────────────────┐
│ FOR EACH IMAGE IN THE M DATA ITEMS,                 │
│ DETERMINE WHETHER THE ORIGINAL IMAGE                │
│ LABEL OF THE IMAGE IS A POTENTIAL ERROR             │
│ IMAGE LABEL BASED ON THE N-1 PREDICTION             │
│ LABELS OF THE IMAGE                                 │
│                      240                            │
└─────────────────────────────────────────────────────┘
```

*FIG. 2*

| TModel_1 | | | | |
|---|---|---|---|---|
| DS_2 | Image | Img_2001 | ... | Img_4000 |
| | Predict_label | PLabel_2001_1 | ... | PLabel_4000_1 |
| DS_3 | Image | Img_4001 | ... | Img_6000 |
| | Predict_label | PLabel_4001_1 | ... | PLabel_6000_1 |
| DS_4 | Image | Img_6001 | ... | Img_8000 |
| | Predict_label | PLabel_6001_1 | ... | PLabel_8000_1 |
| DS_5 | Image | Img_8001 | ... | Img_10000 |
| | Predicted label | PLabel_8001_1 | ... | PLabel_10000_1 |

*FIG. 6A*

| TModel_2 | | | | |
|---|---|---|---|---|
| DS_1 | Image | Img_1 | ... | Img_2000 |
| | Predict_label | PLabel_1_2 | ... | PLabel_2000_2 |
| DS_3 | Image | Img_4001 | ... | Img_6000 |
| | Predict_label | PLabel_4001_2 | ... | PLabel_6000_2 |
| DS_4 | Image | Img_6001 | ... | Img_8000 |
| | Predict_label | PLabel_6001_2 | ... | PLabel_8000_2 |
| DS_5 | Image | Img_8001 | ... | Img_10000 |
| | Predicted label | PLabel_8001_2 | ... | PLabel_10000_2 |

*FIG. 6B*

| | | TModel_3 | | |
|---|---|---|---|---|
| DS_1 | Image | Img_1 | ... | Img_2000 |
| | Predicted label | PLabel_1_3 | ... | PLabel_2000_3 |
| DS_2 | Image | Img_2001 | ... | Img_4000 |
| | Predicted label | PLabel_2001_3 | ... | PLabel_4000_3 |
| DS_4 | Image | Img_6001 | ... | Img_8000 |
| | Predicted label | PLabel_6001_3 | ... | PLabel_8000_3 |
| DS_5 | Image | Img_8001 | ... | Img_10000 |
| | Predicted label | PLabel_8001_3 | ... | PLabel_10000_3 |

*FIG. 6C*

| | | TModel_4 | | |
|---|---|---|---|---|
| DS_1 | Image | Img_1 | ... | Img_2000 |
| | Predicted label | PLabel_1_4 | ... | PLabel_2000_4 |
| DS_2 | Image | Img_2001 | ... | Img_4000 |
| | Predicted label | PLabel_2001_4 | ... | PLabel_4000_4 |
| DS_3 | Image | Img_4001 | ... | Img_6000 |
| | Predicted label | PLabel_4001_4 | ... | PLabel_6000_4 |
| DS_5 | Image | Img_8001 | ... | Img_10000 |
| | Predicted label | PLabel_8001_4 | ... | PLabel_10000_4 |

*FIG. 6D*

| | | TModel_5 | | |
|---|---|---|---|---|
| DS_1 | Image | Img_1 | ... | Img_2000 |
| | Predicted label | PLabel_1_5 | ... | PLabel_2000_5 |
| DS_2 | Image | Img_2001 | ... | Img_4000 |
| | Predicted label | PLabel_2001_5 | ... | PLabel_4000_5 |
| DS_3 | Image | Img_4001 | ... | Img_6000 |
| | Predicted label | PLabel_4001_5 | ... | PLabel_6000_5 |
| DS_4 | Image | Img_6001 | ... | Img_8000 |
| | Predicted label | PLabel_6001_5 | ... | PLabel_8000_5 |

*FIG. 6E*

FACILITATING IDENTIFICATION OF ERROR IMAGE LABEL

BACKGROUND

The present disclosure relates to data processing, and more specifically, to a method, system, and computer program product for facilitating identification of error image labels in training data.

Deep learning models are increasingly used in applications such as object detection and fine-grained image classification. For example, a classification model may be used to label images or pictures. The model is trained with training data to learn how to label images. Upon successful training, the trained model is deployed to label or tag images. The training data comprise images and associated labels that are manually labeled by image annotation personnel. It is inevitable that some images are tagged with error labels. For example, for a particular image, a label "A" should have been tagged, but it is actually tagged with another label "B". In this case, the label "B" is an error label for the image. Error image labels in training data have a negative impact on the training of the model and eventually the performance of the trained model.

SUMMARY

According to various embodiments disclosed herein, a method comprises evenly dividing a training dataset into N subsets. The training dataset includes M data items, each comprising a pair of images and its original image label. The method further comprises training a prediction model to label images by respectively using each of the N subsets as training data, thereby generating N respective trained prediction models. The method further comprises respectively using each of the N trained prediction models trained by using one of the N subsets as training data to label the images in other N−1 subsets of the N subsets, thereby generating N−1 prediction labels for each of the M images in the training dataset. The method further comprises, for each image in the M data items, determining whether the original image label of the image is a potential error image label based on the N−1 prediction labels of the image.

According to various embodiments disclosed herein, there is provided a computer system. The computer system comprises one or more computer processors, one or more computer readable media, and program instructions stored on the one or more computer readable media for execution by at least one of the one or more processors. The program instructions are configured to: evenly divide a training dataset into N subsets. The training dataset includes M data items each comprising a pair of images and its original image label. The method further comprises training a prediction model to label images by respectively using each of the N subsets as training data, thereby generating N respective trained prediction models. The method further comprises respectively using each of the N trained prediction models trained by using one of the N subsets as training data to label the images in other N−1 subsets of the N subsets, thereby generating N−1 prediction labels for each of the M images in the training dataset. The method further comprises, for each image in the M data items, determining whether the original image label of the image is a potential error image label based on the N−1 prediction labels of the image.

Various embodiments disclosed herein relate to a computer program product. The computer program product comprises one or more computer readable media and program instructions stored on the one or more computer readable media for execution by at least one of the one or more processors. The program instructions are configured to perform the following operations: evenly dividing a training dataset into N subsets, wherein the training dataset includes M data items each comprising a pair of image and its original image label; training a prediction model to label images by respectively using each of the N subsets as training data, thereby generating N respective trained prediction models; respectively using each of the N trained prediction models trained by using one of the N subsets as training data to label the images in other N−1 subsets of the N subsets, thereby generating N−1 prediction labels for each of the M images in the training dataset; and for each image in the M data items, determining whether the original image label of the image is a potential error image label based on the N−1 prediction labels of the image.

BRIEF DESCRIPTION OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure.

FIG. 2 is flowchart of a method according to various embodiments of the present disclosure;

FIGS. 6A to 6E are tables that illustrate intermediate results of operations of the method in FIG. 2, according to various embodiments of the present disclosure.

DETAILED DESCRIPTION

Figure 1:
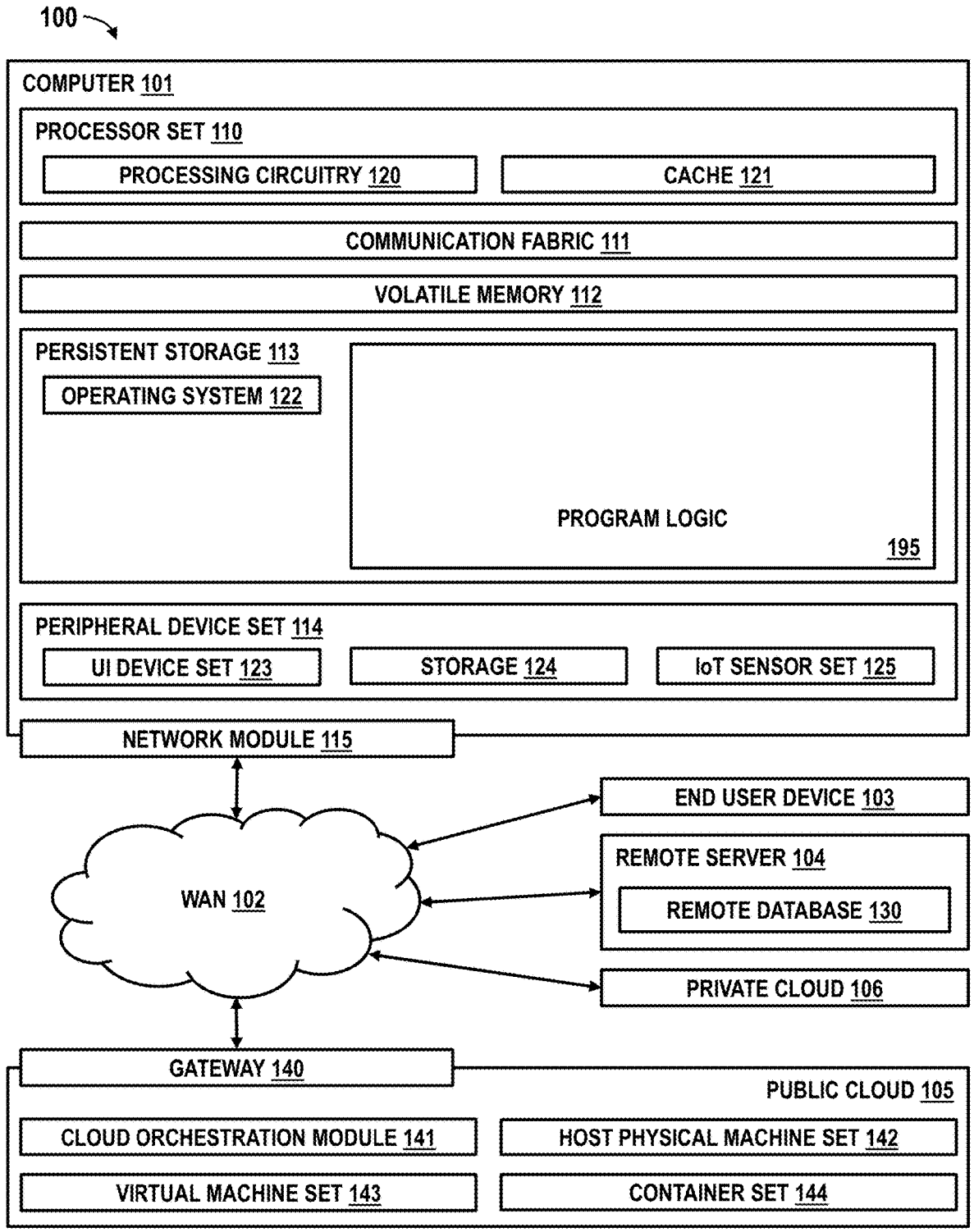
FIG. 1 is a block diagram that shows an example computing environment which is applicable to implement various embodiments of the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology and/or context, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing various embodiments of the inventive methods, including the program logic 195. In addition to the program logic 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and program logic 195, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in program logic 195 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in program logic 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is understood that the computing environment 100 in FIG. 1 is only provided for illustration purpose without suggesting any limitation to any embodiment of this invention, for example, at least part of the program code involved in performing the inventive methods could be loaded in cache 121, volatile memory 112 or stored in other storage (e.g., storage 124) of the computer 101, or at least part of the program code involved in performing the inventive methods could be stored in other local or/and remote computing environment and be loaded when need. For another example, the peripheral device 114 could also be implemented by an independent peripheral device connected to the computer 101 through interface. For a further example, the WAN may be replaced and/or supplemented by any other connection made to an external computer (for example, through the Internet using an Internet Service Provider).

As mentioned above, classification models may be designed for tagging or labelling images. Such models may be built based on different machine learning algorithms. To enable a classification model to label images, it is first trained to learn how to label images, or to predict labels of images. The model is trained with a training dataset as input training data. The training dataset includes a set of images and a set of image labels each associated with respective images. The image labels are provided by image annotation personnel to indicate subjects/topics of the images collected from difference sources. The image labels are also referred to as manual labels to differentiate from model-generated labels.

The trained model may be tested by using test data different from the training data to test its performance. Prediction accuracy is a key performance factor of the trained model. The prediction accuracy may be measured by the percentage of correct labels of all labels generated by the trained model for the set of images in the test data. The trained model may be deployed for predicting labels for images if the test shows that its performance meets requirements.

Correctness of image labels in training data plays an important role in achieving high performance of the trained model in predicting labels for images. Training data having error image labels would adversely impact the performance of the trained model. For example, the training data used to train a classification model is a dataset that 10,000 data items. Each of the data items comprises a pair of image and its original image label. In other words, each data item comprises an image and an image label associated with image. The image labels might include some error image labels, for example, 500 error labels. Let's assume that the prediction accuracy of the trained model is initially 91%. If these error image labels are identified, they may be changed to correct labels. If the trained model is re-trained by using updated training data having decreased error image labels, the prediction accuracy of the trained model might be increased to, for example, 95%.

Various embodiments of the present invention provide a solution that may facilitate the detection of error image labels, such as the 500 error image labels in the above example. The solution may be facilitated and/or enabled by existing techniques such as meta-learning, data layering, Bayesian Active Learning by Disagreement (BALD) and so on, as will be appreciated by those skilled in the art from the following description of embodiments of the invention.

With reference now to FIG. 2, a generic process according to various embodiments of the present disclosure is described. FIG. 2 depicts an overall flowchart of a method/process 201 according to embodiments of the present disclosure. In implementation, the method 201 may be programmed and embodied as error image label detection code that constitutes the program logic 195 as shown in FIG. 1. The error image label detection code may be executed by the computer 101 for facilitating identification of error image labels in a training dataset used for training a model, such as the classification model mentioned above, to label images. As shown, the process 201 comprises the following operations by one or more processing units: evenly dividing a training dataset into N subsets, wherein the training dataset includes M data items each comprising a pair of image and its original image label 210; training a prediction model to label images by respectively using each of the N subsets as training data to generate N respective trained prediction models 220; respectively using each of the N trained prediction models trained by using one of the N subsets as training data to label the images in other N−1 subsets of the N subsets to generate N−1 prediction labels for each of the M images in the training dataset 230; and for each image in the M data items, determining whether the original image label of the image is a potential error image label based on the N−1 prediction labels of the image 240.

Figure 3:
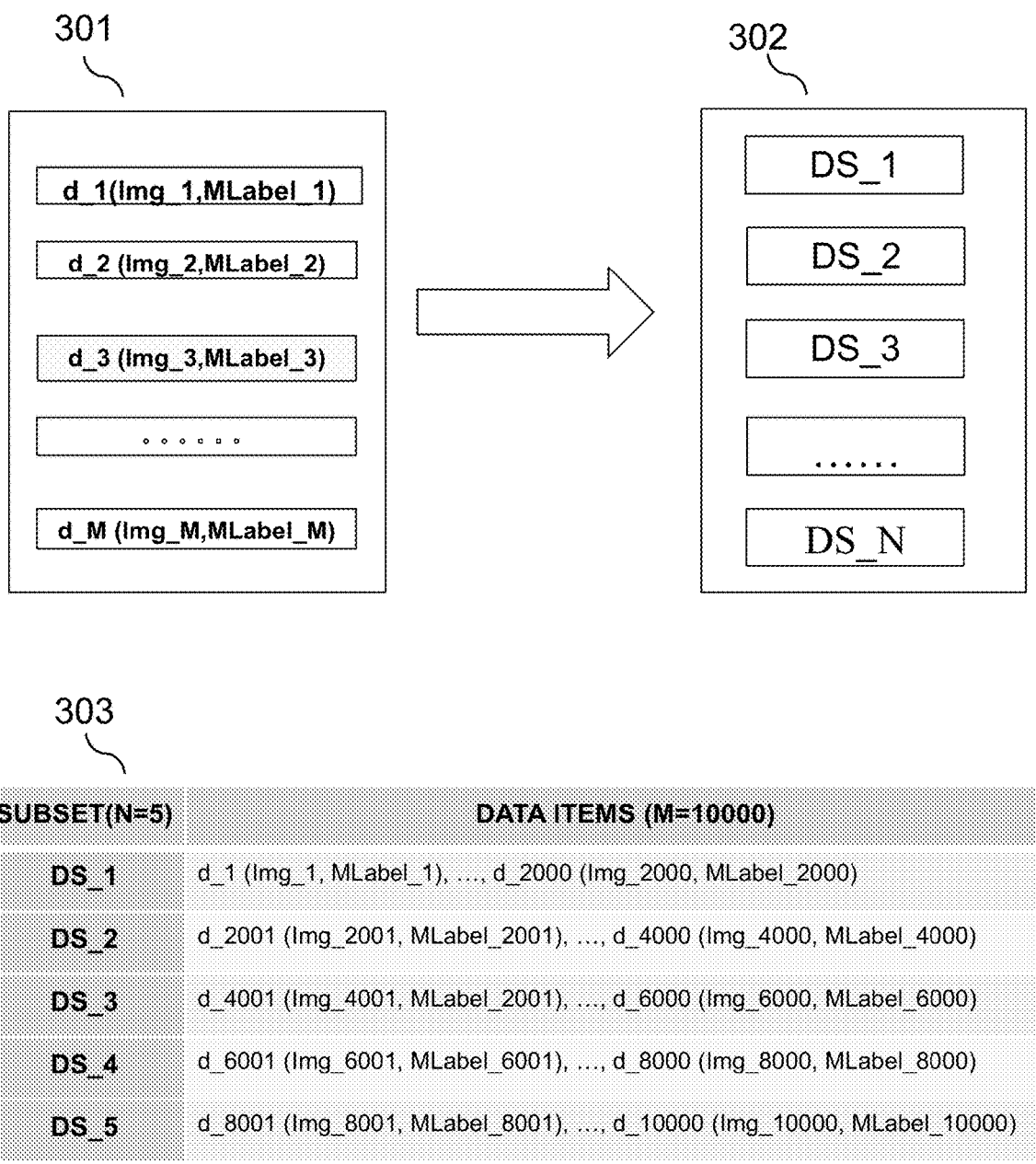
FIGS. 3, 4, and 5 are block diagrams that illustrate operations of the method in FIG. 2 according to various embodiments of the present disclosure.
Figure 4:
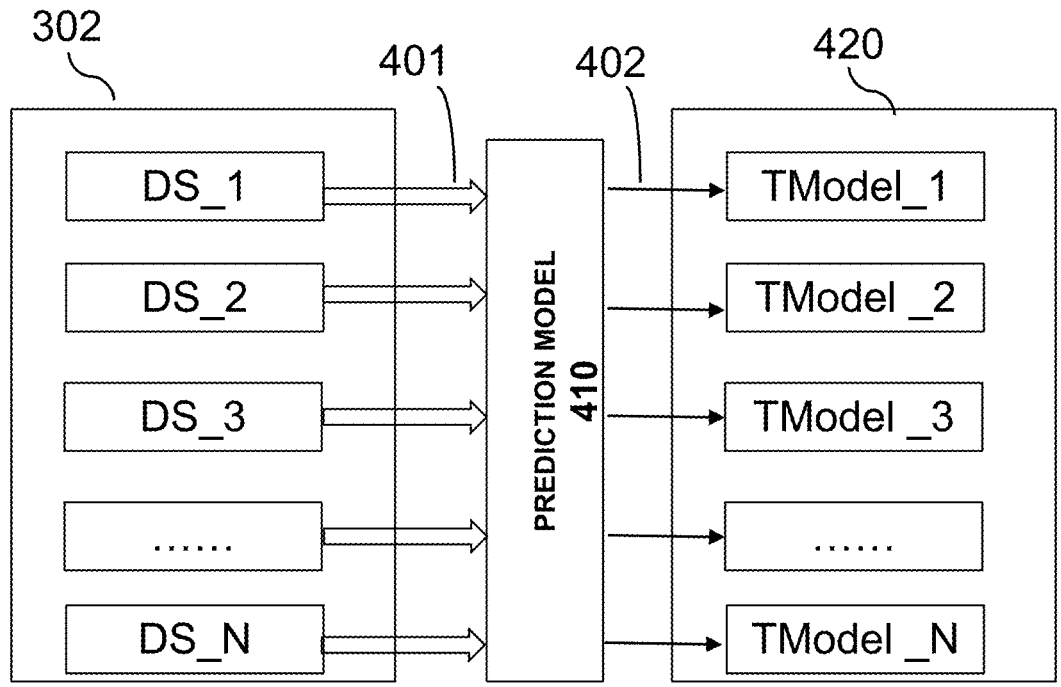
Figure 5:
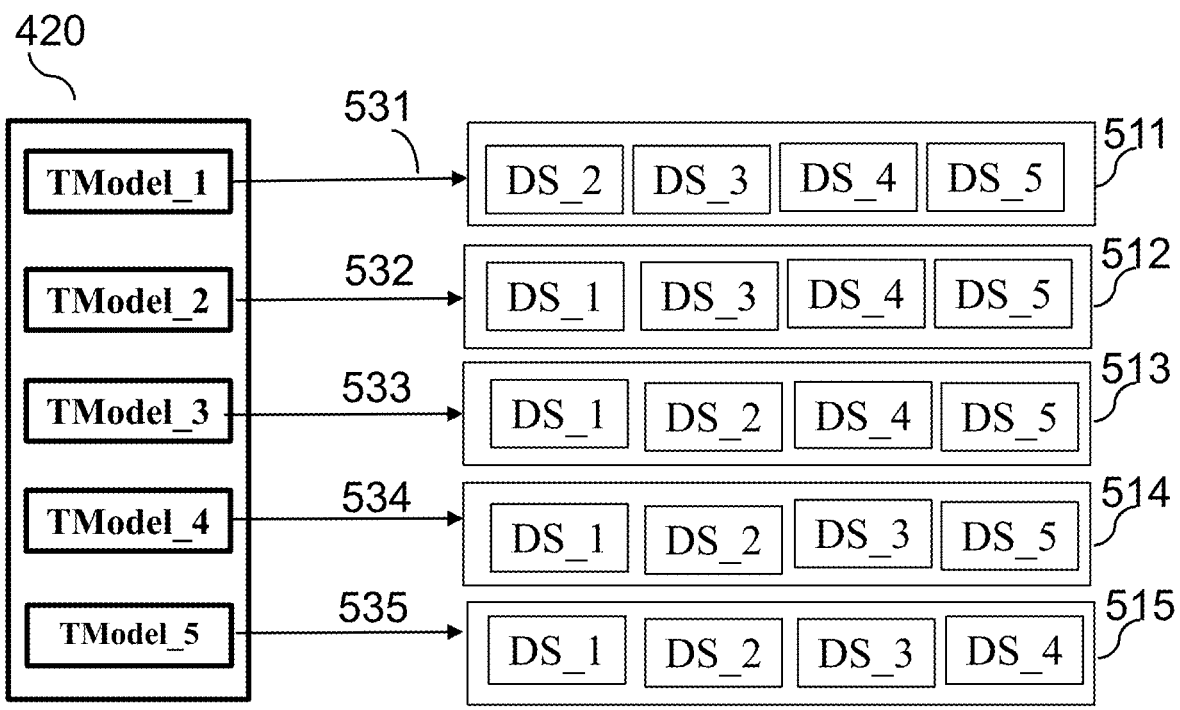

Embodiments of the operation of the method 201 will be described with further reference to FIG. 3 through FIG. 6E, where FIG. 3, FIG. 4, and FIG. 5 illustrate operations of the process in FIG. 2, and FIG. 6A, FIG. 6B, FIG. 6C, FIG. 6D and FIG. 6E illustrate intermediate results of an operation of the process in FIG. 2.

The operation of the method 201 may be started when a training dataset to be used for training and/or re-training a classification model for labelling images is ready. The training dataset 301 is shown in FIG. 3. FIG. 3 depicts the operation at block 210 in FIG. 2. As shown, the training dataset 301 includes M data items, d_1, d_2 ..., d_M. Each data item d_i ($1 \leq i \leq M$) is represented by an image Img_i and an associated image label MLabel_i which is manually tagged for the image Img_i. Therefore, each data item d_i may alternatively be denoted by a tuple (Img_i, MLabel_i) representing image Img_i and its image label MLabel_i, the latter being also referred to as a "manual label" or "original image label".

According to embodiments of the present disclosure, the data items in the training dataset may be categorized according to original image labels in the data items. For example, label_1 indicates its associated image Img_1 is about "cat", label_2 indicates its associated image Img_2 is about "dog", and label_3 indicates its associated image Img_3 is about "tiger". Therefore, d_1, d_2 and d_3 respectively belong to three different categories: category C1 representing cat, category C2 representing dog, and category C3 representing tiger.

At block 210, the training dataset is evenly divided into N subsets, wherein the training dataset includes M data items each comprising a pair of images and its original image label. The operation is represented by an arrow from the training dataset 301 to the N (N>1) subsets 302, each being denoted as DS_1, DS_2, ..., DS_N. As mentioned above, the training dataset 301 includes M data items. The evenly dividing means that each of the N subsets will include roughly the same number (n/N) of data items; each of the data items comprises a pair of images and its original image label.

For example, assume that the training dataset 301 includes ten thousand data items (M=10,000) and they are evenly divided into five subsets (N=5). Then, each of the subsets 302 includes two thousand (2000=10000/5) data items.

As used herein, "evenly" and "roughly the same" means that the data items are divided as evenly as possible depending on the amount of data items in the dataset 301. In other words, the subsets each do not necessarily include exactly an equal number of data items.

According to an embodiment of the invention, the category distribution of data items in each of the subsets DS_1, DS_2, . . . , and DS_5 follows the category distribution of data items in the training dataset 301. Here the term "category distribution" means the relative proportion of the amount of data items belonging to different categories. For example, in the training dataset 301, there are 3,000 data items of the category C1, 4,000 data items of the category C2 and 3,000 data items of the category C3. Then it may be said that the category distribution of data items in the training dataset 301 is 3,000:4,000:3,000, or 3:4:3. In the example, to follow the category distribution of data items in the training dataset 301, each of five subsets DS_1, DS_2, . . . , and DS_5 may include 600 data items of the category C1, 800 data items of the category C2 and 600 data items of the category C3, because 600:800:600 makes 3:4:3.

To simplify the description, hereinafter, as an example only, it is assumed M=10000 and N=5. Accordingly, subset DS_1 includes data items d_1 to d_2000, subset DS_2 includes d_2001 to d_4000, subset DS_3 includes d_4001 to d_6000, subset DS_4 includes d_6001 to d_8000, and subset DS_5 includes d_8001 to d_10000, as shown in a table 303 at the bottom of FIG. 3.

In FIG. 2, after operation 220, the process proceeds to operation 230. At operation 230, a prediction model is trained to label images by respectively using each of the N subsets as training data, thereby generating N respective trained prediction models. FIG. 4 illustrates the operation 230.

As shown in FIG. 4, a prediction model 410 is to be trained to label images. In other words, the prediction model 410 will be trained to tag images or to "predict" labels for images. FIG. 4 also shows the subsets 302, namely DS_1, DS_2, . . . , DS_N. In addition, FIG. 4 shows N trained models 420, namely TModel_1, TModel_2, . . . , TModel_N.

An arrow 401 from the subset DS_1 to the prediction model 410 indicates that the prediction model 410 is trained to learn how to label images by using the subset DS_1 as training data. After training, a trained prediction model, TModel_1, is generated from the prediction model 410, as is indicated by an arrow 402 from the prediction model 410 to the TModel_1.

The prediction model 410 may be designed and built by leveraging a Meta Learning algorithm. For example, it may be built based on API-NET, a Fine Grained Image Classification algorithm, and so on. For the purpose of the present disclosure, prediction models of any design might be implemented in practicing the present disclosure. As the present disclosure is focused on improving training data rather than prediction models, details regarding the design, training and testing of prediction models will be omitted here to avoid obscuring the present disclosure.

Generally, the prediction model 410 may be trained with the subset DS_i (i=1,2, . . . . N) as training data one by one, resulting in respective trained prediction models TModel_i (i=1,2, . . . . N).

Continuing with the subsets in the table 303 (FIG. 3) as an example, as indicated by an arrow 401, the subset DS_1 is used as input training data to train the prediction model 410 to label images. The subset DS_1 includes 2000 data items, d_1, d_2, . . . , d_2000. Specifically, the subset DS_1 includes 2000 pairs of image and original image label, i.e., <Img_1, MLabel_1>, <Img_2, MLabel_2>, . . . , <Img_2000, MLabel_2000>. Therefore, the 2000 pairs of image and image label may serve as input training data to train the prediction model 410 to label images. As indicated by an arrow 402, after training, a first trained prediction model is generated, which is denoted as TModel_1.

Similarly, the subset DS_2 is used as input training data to train the prediction model 410 to label images. In other words, 2000 pairs of <Img_2001, MLabel_2001>, <Img_2002, MLabel_2002>, . . . , <Img_4000, MLabel_4000> serve as input training data to train the prediction model 410 to label images. After training, a second trained prediction model is generated, denoted as TModel_2.

In a similar manner, other three trained prediction model, namely a third model TModel_3, a fourth model TModel_4, and a fifth model TModel_5 are generated by training the prediction model 410 with input subset DS_3, DS_4 and DS_5, respectively.

The five trained prediction models TModel_1, Tmodel_2, Tmodel_3, Tmodel_4 and Tmodel_5 are different trained models. In fact, the performance of the different trained models might be different due to different training data DS_1, DS_2, DS_3, DS_4, and DS_5. For example, the accuracy of prediction of Tmodel_1 might be different from Tmodel_2, because they are trained independently by using different subsets DS_1 and DS_2, respectively. However, because the DS_1, DS_2, DS_3, DS_4, and DS_5 are the results of evenly dividing the initial training dataset 301, and the category distribution of data items in each of the subsets DS_1, DS_2, . . . , and DS_5 follows the category distribution of data items in the training dataset 301, the difference of the prediction accuracy of the trained models will be slight.

According to various embodiments of the present disclosure, the sizes of the subsets may be adjusted to improve the prediction accuracy of the trained prediction models. According to embodiments of the present disclosure, the number of subsets, N, may be decreased to increase the size of the subset in order to improve the prediction accuracy of the trained models. The increase of the training data would lead to the increase of the prediction accuracy of the trained prediction model. And the decrease of the number of the subsets 302 would lead to the increase of the amount of data items in each of the subsets DS_1, DS_2, . . . , and DS_5. In implementation, given the number M of data items, an initial N is set as the number of subsets. The prediction model is trained and tested. If the prediction accuracy of all trained prediction models meets a predefined threshold, then the trained models TModel_1, TModel_2, TModel_3, TModel_4 and TModel_5 are determined. Otherwise, N is decreased and the above steps are repeated.

According to various embodiments of the present disclosure, the sizes of the subsets may be selected such that the variance of the prediction accuracy of the trained prediction models is minimized. In other words, if there are different sizes such that the prediction accuracy of all trained prediction models meets the threshold, one of the sizes is chosen such that the variance of the prediction accuracy of all trained prediction models is the smallest.

Now that the N trained models 420 are ready for use to label images, the process proceeds to operation 230. At operation 230, each of the N trained prediction models 420, which is trained by using one of the N subsets as training data, is used respectively to label the images in other N−1 subsets, thereby generating N−1 prediction labels for each of the M images in the training dataset 301. FIG. 5 illustrates the operation 230.

Continuing with the subsets in the table 303 as an example to simplify the description, FIG. 5 shows the five trained prediction models 420, namely TModel_1, Tmodel_2. Tmodel_3, Tmodel_4 and Tmodel_5. Each of the five trained prediction models 420 is trained by using a respective one of the five subsets DS_1, DS_2, DS_3, DS_4 and DS_5 as training data. In other words, the trained prediction model TModel_1 is trained with DS_1 as training data. Similarly, TModel_2 is trained with DS_2 as training data; TModel_3 is trained with DS_3 as training data; TModel_4 is trained with DS_4 as training data and TModel_5 is trained with DS_5 as training data.

FIG. 5 also shows five subset combinations 511, 512, 513, 514, and 515. The subset combination 511 includes subsets DS_2, DS_3, DS_4 and DS_5, which are four (N−1) subsets of the five (N) subsets other than DS_1, the subset combination 512 being used as training data to generate the trained prediction model TModel_1.

Similarly, the subset combination 512 includes subsets DS_1, DS_3, DS_4, and DS_5, which are the four (N−1) subsets of the five (N) subsets other than DS_2, the subset combination 512 being is used as training data to generate the trained prediction model TModel_2. The subset combination 513 includes subsets DS_1, DS_2, DS_4, and DS_5, which are the four (N−1) subsets of the five (N) subsets other than DS_3, the subset combination 513 being used as training data to generate the trained prediction model TModel_3.The subset combination 514 includes subsets DS_1, DS_2, DS_3, and DS_5, which are the four (N−1) subsets of the five (N) subsets other than DS_4, the subset combination 514 being used as training data to generate the trained prediction model TModel_4. The subset combination 515 includes subsets DS_1, DS_2, DS_3, and DS_4, which are the four (N−1) subsets of the five (N) subsets other than DS_5, the subset combination 515 being used as training data to generate the trained prediction model TModel_5.

An arrow 531 from the trained prediction model TModel_1 to the subset combination 511 indicates that the trained prediction model TModel_1, which is trained with DS_1, is used to label the images in the subset combination 511.

In other words, the arrow 531 indicates that the trained prediction model TModel_1 is applied to DS_2, DS_3, . . . , DS_N to label the images in DS_2, DS_3, DS_4, DS_5 (N=5). In other words, the trained prediction model TModel_1 is applied to DS_2, DS_3, . . . , DS_N to generate labels of the images in DS_2, DS_3, DS_4, DS_5 (N=5). In the following description, such a label generated by a trained prediction model such as TModel_1 is also referred to as a "prediction label". Reference numbers 532, 533, 534, and 535 similarly apply to TModel_2, TModel_3, TModel_4, and TModel_5, respectively.

As shown in the Table 303, the subset DS_2 includes a set of two thousand images Img_2001, Img_2002, . . . , and Img_4000. The trained model TModel_1 is used to label each of the two thousand images in DS_2, resulting in two thousand prediction labels. Specifically, for the Img_2001, TModel_1 generates a prediction label which may be denoted as PLabel_2001_1, wherein "PLabel" represents prediction label, the suffix "_2001" represents the associated image Img_2001, and the suffix "_1" represents the trained prediction model TModel_1. In a similar manner, TModel_1 generates a prediction label PLabel_2002_1 for Img_2002, . . . , and a prediction label PLabel_4000_1 for Img_4000.

FIG. 6A illustratively shows the prediction labels for each of the images in DS_2 generated by the trained prediction model TModel_1.

Specifically, the prediction labels, PLabel_2001_1 to PLabel_4000_1 respectively for the two thousand images, Img_2001 to Img_4000 in the subset DS_2, are shown in the first row of the table in FIG. 6A.

The subset DS_3 includes a set of two thousand images Img_4001, Img_4002, . . . , Img_6000. In a similar manner, TModel_1 generates PLabel_4001_1 to PLabel_6000_1 respectively for the two thousand images, Img_4001 to Img_6000 in the subset DS_3. This is illustratively shown in the second row of the table in FIG. 6A.

The subset DS_4 includes a set of images Img_6001, Img_6002, . . . , Img_8000. In a similar manner, TModel_1 generates PLabel_6001_1 to PLabel_8000_1 respectively for the two thousand images, Img_6001 to Img_8000, in the subset DS_4. This is illustratively shown in the fourth row of the table in FIG. 6A.

The subset DS_5 includes a set of images Img_8001, Img_8002, . . . , Img_10000. In a similar manner, TModel_1 generates PLabel_8001_1 to PLabel_10000_1 respectively for the two thousand images, Img_8001 to Img_10000, in the subset DS_5. This is illustratively shown in the fifth row of the table in FIG. 6A.

Similar to TModel_1, the trained model TModel_2 is applied to DS_1, DS_3, DS_4, DS_5 to generate prediction labels of images in DS_1, DS_3, DS_4, DS_5 in a similar manner as describe above with respect to the trained model TModel_1. The prediction labels generated for the images in DS_1, DS_3, DS_4, DS_5 by TModel_2 are illustratively summarized in the first row to the fourth row of the table in FIG. 6B.

Similarly, the trained model TModel_3 is applied to DS_1, DS_2, DS_4, DS_5 to generate prediction labels of images in DS_1, DS_2, DS_4, DS_5 in a similar manner as describe above with respect to TModel_1. The prediction labels generated for the images in DS_1. DS_2, DS_4, DS_5 by TModel_3 are illustratively summarized in the first row to the fourth row of the table in FIG. 6C.

Similarly, the trained model TModel_4 is applied to DS_1, DS_2, DS_3, DS_5 to generate prediction labels of images in DS_1, DS_2, DS_3, DS_5 in a similar manner as describe above with respect to TModel_1. The prediction labels generated for the images in DS_1, DS_2, DS_3, DS_5 by TModel_4 are illustratively summarized in the first row to the fourth row of the table in FIG. 6D.

Similarly, the trained model TModel_5 is applied to DS_1, DS_2, DS_3, DS_4 to generate prediction labels of images in DS_1, DS_2, DS_3, DS_4 in a similar manner as describe above with respect to TModel_1. The prediction labels generated for the images in DS_1. DS_2, DS_3, DS_4 by TModel_5 are illustratively summarized in the first row to the fourth row of the table in FIG. 6E.

Continuing with the above example where N=5 and M=10000, as a result of respectively using each of the five (N) trained prediction models 420 trained by using one of the N subsets as training data to label the images in other four (N−1) subsets of the five subsets, for each of the 10000 (M) images in the M data items in the dataset 301, 4 (N−1) prediction labels are generated. For example, the image Img_4001 in the M data items belongs to the subset DS_3. For the image Img_4001, four prediction labels are generated respectively by four trained prediction models TModel_1, TModel_2, TModel_4 and TModel_5. Specifically, the four prediction labels are: PLabel_4001_1 generated by TModel_1 (see FIG. 6A), PLabel_4001_2 generated by TModel_2 (see FIG. 6B), PLabel_4001_4 generated by TModel_4 (see FIG. 6D), and PLabel_4001_5 generated by TModel_5 (see FIG. 6E).

After the operation 230, the process proceeds to the operation 240. At the operation 240, for each image in the M data items in the training dataset 301, it is determined whether the original image label of the image is a potential error image label based on the N−1 prediction labels of the image.

Generally, whether the original image label of the image is a potential error image label depends on whether the original image label and the N−1 prediction labels of the image are consistent. If they are not consistent, then the original image label of the image is a potential error image label.

For example, the pair <Img_4001, MLabel_4001> is comprised in a data item (not shown) in the training dataset 301. Img_4001 is an image and MLabel_4001 is the original image label of Img_4001. As shown in the tables of FIGS. 6A to 6E, for the image Img_4001, there are four (N−1) prediction labels, namely PLabel_4001_1 (see FIG. 6A), PLabel_4001_2 (see FIG. 6B), PLabel_4001_4 (see FIG. 6D), and PLabel_4001_5 (see FIG. 6E). The four prediction labels are said to be corresponding to the image label MLabel_4001.

An original image label (e.g., MLabel_4001) and its corresponding prediction labels (e.g., PLabel_4001_1, PLabel_4001_2, PLabel_4001_4 and PLabel_4001_5) are consistent if the original image label is consistent with all of the prediction labels. For example, assume MLabel_4001 is "A". If each of PLabel_4001_1, PLabel_4001_2, PLabel_4001_4 and PLabel_4001_5 is also "A", then MLabel_4001 and its corresponding prediction labels are consistent.

According to an embodiment of the present disclosure, determining whether the original image label of the image is a potential error image label based on the N−1 prediction labels of the image comprises determining the original image label to be a potential error image label in response to the original image label of the image being not consistent with one of the N−1 prediction labels of the image.

For example, assume MLabel_4001 is "A". If one of PLabel_4001_1, PLabel_4001_2, PLabel_4001_4 and PLabel_4001_5 is not "A", then MLabel 4001 and its corresponding prediction labels are not consistent. In that case, MLabel_4001 is determined to be a potential error image label.

According to an embodiment of the present disclosure, determining whether the original image label of the image is a potential error image label based on the N−1 prediction labels of the image further comprises determining the original image label of the image to be a potential error image label in response to one of the N−1 prediction labels being not consistent with another of the N−1 prediction labels. For example, if PLabel_4001_1 is "A" and PLabel_4001_2 is "B", the N−1 prediction labels of the image are not consistent. In that case, the original image label MLabel_4001 will be determined to be a potential error image label, because PLabel_4001_1 is different from PLabel_4001_2, so the original image label Mlabel_4001 would be not consistent with at least one of the Plabel_4001_1 and Plabel_4001_2.

According to an embodiment of the present disclosure, the MLabel_4001, which is determined to be a potential error image label, may be output to a noisy dataset (not shown) along with its associated image Img_4001.

The above process for <Img_4001, MLabel_4001> will be repeated for each pair <Img_i, MLabel_i> in the training dataset 310. Then the execution of the operation of the method 201 may be ended, resulting in the noisy set which includes potential error image labels.

Those skilled in the art will appreciate that the determination of potential error image label described above is based on the Violence Full Consistency principle. In this way, the potential error image labels may be effectively identified as the noisy set. For example, in the training dataset 301, a certain image or picture is about "cat" and should have been labelled as "cat', but the image was originally given a label of "dog". In other words, the original image label is "dog". With the method 201 and the error image label detection code 200 of the present disclosure, the original image label "dog" may be automatically determined to be a potential error image label. Such potential error image labels in the noisy set may be separately reviewed to determine whether they are really error images. The potential error image labels may be reviewed manually or automatically. The noisy set is much smaller than the training dataset 301, so it will take less effort to review the potential error image labels in the noisy set than to review the original image labels in the entire training dataset 301. Therefore, the noisy set output according to various embodiments of the present disclosure will facilitate a final identification of error image labels from the potential error image labels. The potential error image labels finally identified as error image labels may be changed to correct image labels. In this way, the original training dataset 301 may be changed to an updated training dataset containing fewer error image labels. The updated training dataset (not shown) may be used as training data to re-train the classification model. Because the updated training dataset is more accurate than the original training data set, the accuracy of the re-trained classification model will be improved compared with the trained classification model that was trained by using the original training dataset.

Embodiments of processing of facilitating identification of error image label have been described. The processing of facilitating identification of error image label according to embodiments of this disclosure could be implemented in the computing environment of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising, using one or more processing units:
   evenly dividing a training dataset into N subsets, wherein the training dataset includes M data items, each comprising a pair comprising an image and its original image label, wherein N is an integer greater than 1 and M is an integer greater than 0;
   training a prediction model to label images by respectively using each of the N subsets as training data to generate N trained prediction models;
   respectively using each of the N trained prediction models trained by using one of the N subsets as training data to label the images in other N−1 subsets of the N subsets to generate N−1 prediction labels for each of the M images in the training dataset; and
   for each image in the M data items, determining whether the original image label of the image is a potential error image label is based on the N−1 prediction labels of the image.

2. The computer-implemented method of claim 1, wherein:
   the data items in the training dataset are categorized according to the original image labels in the data items; and
   the category distribution of data items in each of the N subsets follows the category distribution of data items in the training dataset.

3. The computer-implemented method of claim 1, further comprising:
   adjusting the sizes of the subsets to improve prediction accuracy of the trained prediction models.

4. The computer-implemented method of claim 3, further comprising:
   selecting the sizes of the subsets such that the variance of the prediction accuracy of the trained prediction models is minimized.

5. The computer-implemented method of claim 1, wherein determining whether the original image label of the image is a potential error image label based on the N−1 prediction labels of the image comprises:
   in response to the original image label of the image being not consistent with one of the N−1 prediction labels of the image, determining the original image label to be a potential error image label.

6. The computer-implemented method of claim 1, wherein determining whether the original image label of the image is a potential error image label based on the N−1 prediction labels of the image comprises:
   in response to one of the N−1 prediction labels being not consistent with another of the N−1 prediction labels, determining the original image label to be a potential error image label.

7. A computer system comprising:
   one or more computer processors;
   one or more computer readable media; and
   program instructions, stored on the one or more computer readable media for execution by at least one of the one or more processors, wherein the program instructions are configured to performing the following operations:
   evenly dividing a training dataset into N subsets, wherein the training dataset includes M data items each comprising a pair comprising an image and its original image label, wherein N is an integer greater than 1 and M is an integer greater than 0;
   training a prediction model to label images by respectively using each of the N subsets as training data to generate N respective trained prediction models;
   respectively using each of the N trained prediction models trained by using one of the N subsets as training data to label the images in other N−1 subsets of the N subsets to generate N−1 prediction labels for each of the M images in the training dataset; and
   for each image in the M data items, whether the original image label of the image is a potential error image label is based on the N−1 prediction labels of the image.

8. The computer system of the claim 7, wherein:
   the data items in the training dataset are categorized according to original image labels in the data items; and
   the category distribution of data items in each of the N subsets follows the category distribution of data items in the training dataset.

9. The computer system of the claim 7, wherein the operations further comprise:
   adjusting the sizes of the subsets to improve prediction accuracy of the trained prediction models.

10. The computer system of the claim 7, wherein the operations further comprise:
    selecting the sizes of the subsets such that the variance of the prediction accuracy of the trained prediction models is minimized.

11. The computer system of the claim 7, wherein determining whether the original image label of the image is a potential error image label based on the N−1 prediction labels of the image comprises:
    in response to the original image label of the image being not consistent with one of the N−1 prediction labels of the image, determining the original image label to be a potential error image label.

12. The computer system of the claim 7, wherein determining whether the original image label of the image is a potential error image label based on the N−1 prediction labels of the image comprises:
    in response to one of the N−1 prediction labels being not consistent with another of the N−1 prediction labels, determining the original image label to be a potential error image label.

13. A computer program product comprising:
    one or more computer readable storage media; and program instructions, stored on the one or more computer readable storage media
    for execution by at least one of the one or more processors, wherein the program instructions are configured to performing the following operations:
    evenly dividing a training dataset into N subsets, wherein the training dataset includes M data items each comprising a pair comprising an image and its original image label, wherein N is an integer greater than 1 and M is an integer greater than 0;
    training a prediction model to label images by respectively using each of the N subsets as training data to generate N respective trained prediction models;
    respectively using each of the N trained prediction models trained by using one of the N subsets as training data to label the images in other N−1 subsets of the N subsets to generate N−1 prediction labels for each of the M images in the training dataset; and for each image in the M data items, determining whether the original image label of the image is a potential error image label based on the N−1 prediction labels of the image.

14. The computer program product of the claim 13, wherein:
the data items in the training dataset are categorized according to original image labels in the data items; and
the category distribution of data items in each of the N subsets follows the category distribution of data items in the training dataset.

15. The computer program product of the claim 13, wherein the operations further comprise:
adjusting the sizes of the subsets to improve prediction accuracy of the trained prediction models.

16. The computer program product of the claim 15, wherein the operations further comprise:
selecting the sizes of the subsets may be chosen such that the variance of the prediction accuracy of the trained prediction models is minimized.

17. The computer program product of the claim 13, wherein determining whether the original image label of the image is a potential error image label based on the N−1 prediction labels of the image comprises:
in response to the original image label of the image being not consistent with one of the N−1 prediction labels of the image, determining the original image label to be a potential error image label.

18. The computer program product of the claim 13, wherein determining whether the original image label of the image is a potential error image label based on the N−1 prediction labels of the image comprises:
in response to one of the N−1 prediction labels being not consistent with another of the N−1 prediction labels, determining the original image label to be a potential error image label.

19. The computer program product of the claim 13, wherein:
the data items in the training dataset are categorized according to original image labels in the data items;
the category distribution of data items in each of the N subsets follows the category distribution of data items in the training dataset; and
the operations further comprise adjusting the sizes of the subsets to improve prediction accuracy of the trained prediction models.

20. The computer program product of the claim 13, wherein:
the data items in the training dataset are categorized according to original image labels in the data items;
the category distribution of data items in each of the N subsets follows the category distribution of data items in the training dataset;
the operations further comprise adjusting the sizes of the subsets to improve prediction accuracy of the trained prediction models;
the determining of whether the original image label of the image is a potential error image label based on the N−1 prediction labels of the image comprises:
in response to the original image label of the image being not consistent with one of the N−1 prediction labels of the image, determining the original image label to be a potential error image label; and
the determining of whether the original image label of the image is a potential error image label based on the N−1 prediction labels of the image comprises:
in response to one of the N−1 prediction labels being not consistent with another of the N−1 prediction labels, determining the original image label to be a potential error image label.

\* \* \* \* \*